July 28, 1959     J. S. ATTINELLO     2,896,881
AERODYNAMIC AIR BRAKE AND LIFT SPOILER FOR AIRCRAFT
Filed April 29, 1955     2 Sheets-Sheet 1

INVENTOR
JOHN S. ATTINELLO

BY

ATTORNEYS

INVENTOR
JOHN S. ATTINELLO

United States Patent Office 2,896,881
Patented July 28, 1959

2,896,881

AERODYNAMIC AIR BRAKE AND LIFT SPOILER FOR AIRCRAFT

John S. Attinello, Falls Church, Va.

Application April 29, 1955, Serial No. 505,077

10 Claims. (Cl. 244—42)

(Granted under Title 35, U.S. Code (1952), sec. 266)

This application is a continuation-in-part of my co-pending application for High Lift Supercirculation System Using Supersonic Blowing, Serial No. 409,545, filed February 10, 1954.

The invention described herein may be manufactured and used by or for the Government of the United States of America for governmental purposes without the payment of any royalties thereon or therefor.

The present invention relates to an aerodynamic air brake and lift spoiler, and more particularly to an air brake and lift spoiler accomplished through directing a stream of air from within a lifting member at approximately perpendicularly to the air stream.

In prior art devices, air brakes to retard the speed of an aircraft in flight have comprised flat plates moveable from a retracted position into the air stream. Because of the large forces acting on these plates, they had to be of very strong construction. That part of the aircraft to which these air brakes were attached also had to be of very strong construction, the combination resulting in a considerable weight penalty, when considered in connection with the actuating mechanism for the plate.

Also in the prior art, lateral control is usually obtained by ailerons. For example, in making a turn, an increase in lift of the outside wing and/or a decrease in lift of the inside wing is required. These results are usually accomplished by the proper manipulation of the ailerons. At high speeds, however, ailerons rapidly lose their effectiveness, and in some cases actually become useless. Also, it is to be noted that at high speeds very large control forces are necessary to move the ailerons, and power booster systems have been resorted to, with attendant structural and weight penalties. Although mechanical spoilers have been used to overcome some of the above noted disadvantages of the aileron, as noted above, there are disadvantages in the use of spoilers, also, such as timelag of effectiveness, reversal of effect at some spoiler deflections and large dynamic loads requiring large control forces. At the higher angles of attack conventional mechanical spoilers become less effective as lateral control devices since they are then operating in regions of separated flow, a condition which is most undesirable, for instance, during landing.

In addition to the above, the use of ailerons causes a loss of part of the wing trailing edge which would otherwise be available for the use of flaps.

The present invention overcomes the above disadvantages by causing a jet of air to be expelled from within the wing generally perpendicularly to the airstream. Hence, jets expelled from both wings will destroy lift and increase drag, thus serving as an effective and comparatively light weight air brake. Alternatively, actuation of only one of the jets will destroy lift and increase drag of that wing, and can be accomplished by a small force, such as the force necessary to open a valve in a compressed air line. The aerodynamic flow changes are accomplished substantially without deleterious aerodynamic effects.

An object of the present invention is to provide an aerodynamic brake of relatively light weight and which will impose relatively light weight and structural penalties.

Another object is to provide a lateral control system which will be easy to operate, relatively light and free of adverse yaw.

A further object of the invention is to provide simple and effective combined lateral control and aerodynamic air brake means.

Still another object is to provide means to spoil lift over the entire span of a wing at touch-down, thus permitting immediate effective application of wheel brakes and permitting a reduction of ground roll and run-way length.

Other objects and many of the attendant advantages of this invention will be readily appreciated as the same becomes better understood by reference to the following detailed description when considered in connection with the accompanying drawings wherein.

Figure 1:
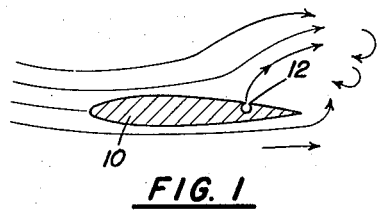
Fig. 1 is a cross-sectional view of an airfoil modified in accordance with the present invention and the air flow thereabout.
Figure 2:
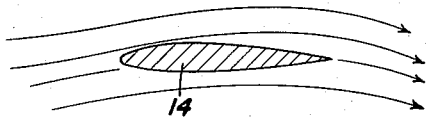
Fig. 2 is a cross-sectional view of a normal airfoil, together with its air flow.

Referring now to the drawings, wherein like reference characters designate like or corresponding parts throughout the several views, there is shown in Fig. 1 an airfoil 10 having spanwise thereof a jet producing pipe 12 therein. The pipe 12 is expelling compressed gas, such as air, substantially perpendicularly to the normal air flow at a high velocity. This produces an air-jet or air-wall, which radically changes the air flow from the normal condition, shown about the airfoil 14 of Fig. 2. The air flow about the airfoil 10, as seen in Fig. 1, rises abruptly in the region of the pipe 12, and a large turbulent area is produced above and behind the (approximately) last quarter-chord length of the airfoil. This turbulent area, of course, results in a large drag.

Figure 3:
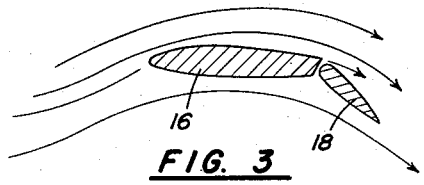
Fig. 3 is a cross-sectional view of a flapped airfoil and the air flow thereabout.
Figure 4:
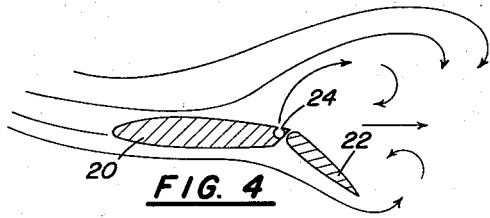
Fig. 4 is a cross-sectional view of an airfoil having a flap and modified in accordance with the present invention, and the air flow thereabout.

In Fig. 3 there is shown an airfoil 16 having a deflected flap 18. The air flow thereabout is normal and well known. In contrast, the airfoil 20 of Fig. 4 has a deflected flap 22 and a pipe 24 which is expelling compressed gas, such as air, at a high velocity substantially perpendicularly to the normal air flow. As in the previous case, Fig. 1, the air flow is radically changed, with attendant decrease in lift and increase in drag.

Figure 5:
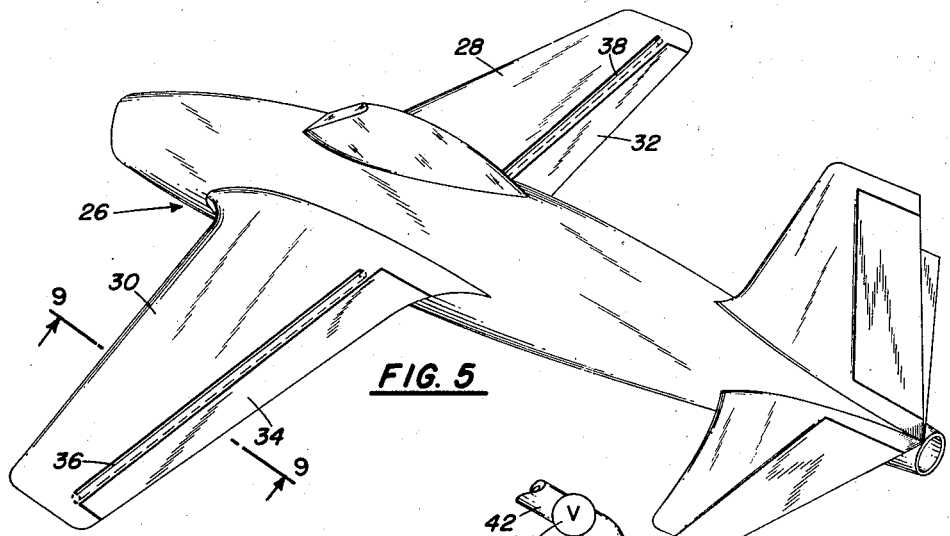
Fig. 5 is a view of an aircraft equipped with a preferred embodiment of the present invention.

There is shown in Fig. 5 an airplane 26 which may conveniently be propelled by a jet engine, not shown. Airplane 26 has wings 28 and 30 having flaps 32 and 34 which extend almost the full span of the wings. Substantially coextensive span-wise with flap 34 of wing 30 there is a slotted pipe 36, and substantially coextensive span-wise with flap 32 of wing 28 is a slotted pipe 38. The slotted pipes 36 and 38 are placed just in front of their respective flaps 34 and 32, and are preferably rotatably mounted in sleeve bearings 39. In one position, the slotted pipes will expel high velocity gas through openings in the wing upper surfaces perpendicularly to the airstream so as to produce the results noted above. In the other position, the slotted pipes will expel high velocity air substantially parallel to and in the direction of the airstream, to increase the efficiency of the flaps, as more fully explained in my co-pending application Serial No. 409,545, filed February 10, 1954, for High Lift Supercirculation System Using Supersonic Blowing. As may be seen from Fig. 5, the airplane 26 has no ailerons.

Figures 6, 7, 8:
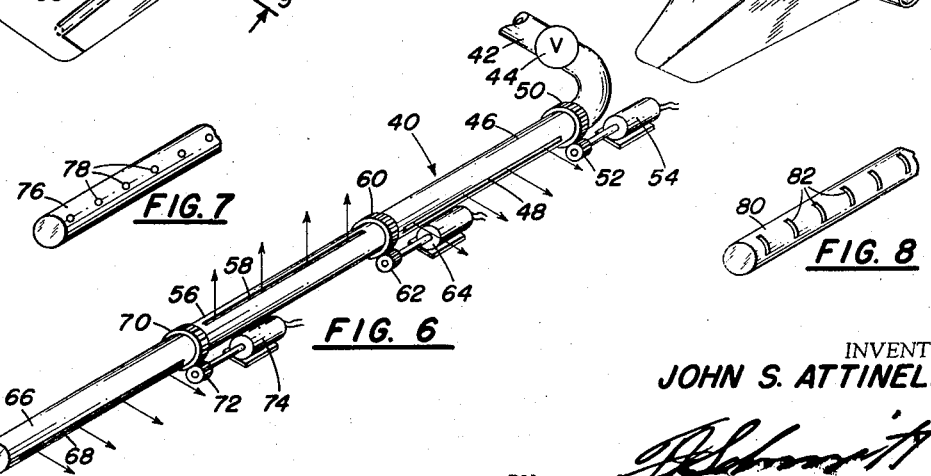
Fig. 6 is a detailed perspective view of another embodiment of the invention.
Fig. 7 shows yet another embodiment of the invention.
Fig. 8 is still another embodiment thereof.
Figure 9:
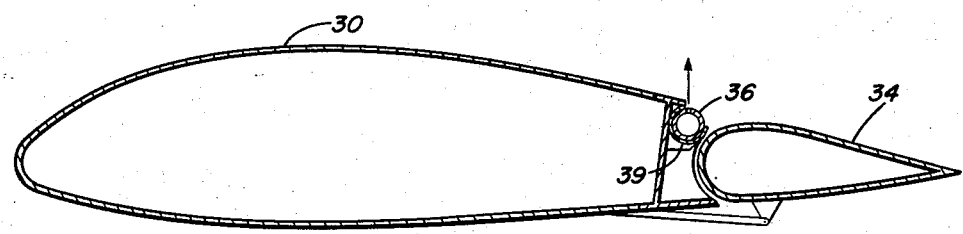
Fig. 9 shows a cross-sectional view taken along line 9—9 of Fig. 5 with a jet directed for lift spoilage.
Figure 10:
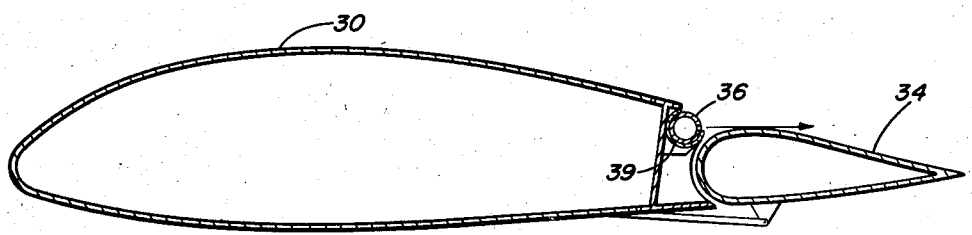
Fig. 10 shows a similar cross-sectional view with a jet directed for lift augmentation.

In Fig. 6 there is shown a blowing system 40 comprising an inlet pipe 42 having a control valve 44 therein. Inlet pipe 42 is connected with a pipe 46 having a slot 48 therein. A large gear 50 is fixed on pipe 46, and meshes with gear 52, driven by electric motor 54. Pipe 46 joins with pipe 56 having a slot 58 therein and a gear 60 thereon which meshes with gear 62 driven by electric motor 64. Pipe 56 joins with pipe 66 having a slot 68 therein and gear 70 thereon. Gear 70 meshes with gear 72 driven by electric motor 74. Each of the pipes 46, 56 and 66 is supported for rotation about its longitudinal axis, and may be independently actuated by the motors 54, 64 and 74, respectively. Pipe 46 is placed in front of a flap, and pipe 66 in front of an aileron in this modification. The flap and aileron may have adjacent edges meeting behind pipe 56, or the flap may be coextensive with pipes 46 and 56, or the trailing edge of the wing behind pipe 56 may be fixed.

Air may also be expelled from within any of the pipes by other orifices than a slotted orifice. For instance, as shown in Fig. 7, the air may be expelled from pipe 76 through axially alined holes 78. As shown in Fig. 8, the air may be expelled from pipe 80 through axially alined circumferentially extending slots 82. These modifications yield a relatively higher aerodynamic drag, in addition to the lift spoilage.

In an airplane such as 26, lateral control is effected by admitting air to one or the other of pipes 36 or 38 by movement of the control stick acting to open a differential valve to one or the other of the pipes from a source of air under high pressure. This source may conveniently be bleed air from the compressor of the turbo-jet engine of the airplane. Assuming a turn to the left is desired, air is expelled from pipe 36 in the left wing substantially vertically of the air stream at high velocity. The direction of ejection may even be slightly forward, rather than vertically. The pipe 38 is inactive. Because the lift on the wing 30 is substantially reduced by the air-wall thus formed, the lift on wing 28 will cause the airplane to roll about its longitudinal axis, and because the drag is substantially increased on wing 30, a yaw to the left will be effected. This yaw is in the favorable direction, in contrast to the yaw produced by ailerons.

In the landing of an airplane, it is well known that the forces tending to stop the airplane are the air drag force and the wheel braking force. The air drag force varies directly with and proportionally to the coefficient of drag. Hence, an air-wall at the time of landing will materially increase the drag coefficient and the total drag force. The wheel braking force is the product of the total airplane weight minus the weight sustained by the lift on the wings, multiplied by the tire-to-runway friction coefficient when braking. Thus, a decrease in lift will decrease the weight sustained by the wings, place more weight on the wheels, and increase the braking force. It will therefore be apparent that the use of the present invention will materially shorten the ground roll of an airplane equipped therewith, as airplane 26.

Dive brakes have been increasingly used on military aircraft as speeds have increased. By causing air to be expelled at high velocity from pipes 36 and 38, a drag-increasing air-wall will be formed over both of the wings of airplane 26, thus permitting the invention to serve as a dive brake. There are consequently no concentrated air loads to be absorbed, but only changes in pressure distribution over large areas of the wings. It will be understood, of course, that an air-wall aerodynamic air brake may be created at the fuselage instead of or in addition to the air-wall at the wings of an airplane. Since the tubes 36 and 38 are rotatable, they may also be used, as circumstances dictate, for super-circulation in accordance with the teachings of my above noted co-pending application.

The embodiment of the invention shown in Fig. 6 is to be used with an airplane having flaps and ailerons. In certain situations, it may be desirable to increase circulation over the ailerons, and to create an air-wall over the middle portion of the wing. The air-wall will increase the drag, while the effectiveness of the ailerons will be retained, when the pipes are in the position shown in Fig. 6. Also, the air flow near the fuselage will not be disturbed, and hence the tail control surface will remain effective. For landing, all of the tubes may be turned to expel air at high velocity perpendicularly to the airstream, as in Fig. 5. In yet other circumstances, the tubes may all expel air rearwardly, to obtain the advantages noted in my above noted co-pending application. The pipes 46, 56 and 66, and their corresponding pipes in the other wing of the aircraft, are selectively rotated by actuation of their associated electric motors and gears, the motors being controlled by a suitable multiple position switch in the cockpit of the airplane.

Although I have stated that air is expelled from the various tubes at a high velocity, it will be understood that this is a relative term, and that different velocities may be used for different forward speeds. The invention relies on the radical change in air flow, illustrated in Figs. 1 and 4, and it will be apparent to one skilled in the art that the minimum jet velocity necessary to produce the changed air flow illustrated will depend on the normal air velocity over the wing or other aerodynamic surface.

Obviously many modifications and variations of the present invention are possible in the light of the above teachings. It is therefore to be understood that within the scope of the appended claims the invention may be practiced otherwise than as specifically described.

What is claimed is:

1. In an airplane having a wing extending from each side thereof, spanwise extending openings in the upper surfaces of said wings, means in each wing to expel gas at high velocity from within said wing through one of said openings located in said wing, each of said means comprising a plurality of pipes extending spanwise of said wing in juxtaposition with one of said openings, each of said pipes having a slot therein and being independently rotatable from a first position in which said slot expels gas through said one of said openings substantially perpendicularly to the normal air flow and a second position in which said slot expels gas through said one of said openings parallel to and in the direction of the normal air flow, and means to supply gas under pressure to said pipes.

2. The apparatus of claim 1, said pipes being non-coextensive.

3. In an airplane having a wing extending from each side thereof, each of said wings having a flap and an aileron and spanwise extending openings in the upper surface of said wings immediately upstream of said flap and aileron, means in said wings to expel gas through said openings at high velocity from within said wings, said means comprising three independently rotatable pipes in each of said wings, said pipes extending axially of each other and spanwise of the wings and in juxtaposition with said openings, each of said pipes having a slot therein, means to selectively and independently rotate each of said pipes between a first position in which said slot expels gas substantially prependicularly to the normal air flow and a second position in which said slot expels gas parallel to and in the direction of the normal air flow, the most inboard of said pipes being at least partially coextensive with said flaps and the most outboard of said pipes being at least partially coextensive with said ailerons.

4. The apparatus of claim 3, and means to selectively admit gas to the pipes of either wing separately or simultaneously.

5. In an airplane having a wing extending from each side thereof, openings in the upper surfaces of said wings, said openings extending substantially the full span length of said wing at approximately the aft quarter chord length thereof, means in each wing to expel a jet of fluid at high velocity from within said wing through those of said openings located in said wing, each of said means comprising a conduit in juxtaposition with one of said openings located in said wing extending spanwise of said wing and connected to a source of fluid under pressure, said conduit having an axially extending slot therein and being rotatably mounted in said wing, said conduit being rotatable between a lift spoiling position in which said slot expels said fluid through said one of said openings substantially perpendicular to the normal air flow and a lift augmenting position in which said slot expels said fluid through said one of said openings substantially parallel to and in the direction of the normal air flow.

6. In an airplane having a wing extending from each side thereof, one opening in the upper surface of each wing, each of said openings extending substantially the full span length of said wing at approximately the aft quarter chord length thereof, means in each wing to expel a jet of fluid at high velocity from within said wing through said one opening located therein, said means comprising a conduit in juxtaposition with said one opening located in said wing extending spanwise of said wing and connected to a source of fluid under pressure, said conduit having an axially extending slot therein and being rotatably mounted in said wing, said conduit being rotatable between a lift spoiling position in which said slot expels said fluid through said one opening substantially perpendicular to the normal air flow and a lift augmenting position in which said slot expels said fluid through said one opening substantially parallel to and in direction of normal air flow.

7. The apparatus in claim 6, and means connected between said conduit means and said source of fluid to selectively cause fluid to be expelled from either of said conduits.

8. In an airplane having a wing extending from each side thereof, openings in the upper surfaces of said wings, said openings extending substantially the full span length of said wing at approximately the aft quarter chord length thereof, means in each wing to expel a jet of fluid at high velocity from within said wing through those of said openings located in said wing, each of said means comprising a conduit in juxtaposition with one of said openings located in said wing extending spanwise of said wing and connected to a source of fluid under pressure, said conduit having axially aligned holes therein and being rotatably mounted in said wing, said conduit being rotatable between a lift spoiling position in which said holes expel said fluid through said one of said openings substantially perpendicular to the normal air flow and a lift augmenting position in which said holes expel said fluid through said one of said openings substantially parellel to and in the direction of the normal air flow.

9. In an airplane having a wing extending from each side thereof, openings in the upper surfaces of said wings, said openings extending substantially the full span length of said wing at approximately the aft quarter chord length thereof, means in each wing to expel a jet of fluid at high velocity from within said wing through those of said openings located in said wing, each of said means comprising a conduit in juxtaposition with one of said openings located in said wing extending spanwise of said wing and connected to a source of fluid under pressure, said conduit having axially aligned circumferentially extending slots therein and being rotatably mounted in said wing, said conduit being rotatable between a lift spoiling position in which said slots expel said fluid through said one of said openings substantially perpendicular to the normal air flow and a lift augmenting position in which said slots expel said fluid through said one of said openings substantially parallel to and in the direction of the normal air flow.

10. In an airfoil provided with a control surface, means adaptable to use in flight in a first position to expel fluid under pressure through an opening in the upper surface of said airfoil disposed adjacent said control surface thereby disrupting circulation over said airfoil and to use in flight in a second position to expel said fluid under pressure through said opening thereby increasing circulation over said airfoil, said means comprising a conduit rotatably mounted in said airfoil, said conduit having orifice means therein so located that rotation of said conduit to either said first or second positions will retain said orifice means in juxtaposition with said opening, means for rotating said conduit to the desired position, means connected to said conduit to supply said fluid under pressure thereto and control means located in the path of flow of said fluid under pressure to regulate the admission of said fluid to said conduit.

References Cited in the file of this patent
UNITED STATES PATENTS

| | | |
|---|---|---|
| 1,385,257 | McLean | July 19, 1921 |
| 1,775,757 | Gay | Sept. 16, 1930 |
| 1,854,043 | Korner | Apr. 12, 1932 |
| 1,919,142 | Wetzel | July 18, 1933 |
| 2,451,008 | Williams | Oct. 12, 1948 |

FOREIGN PATENTS

| | | |
|---|---|---|
| 719,298 | France | Nov. 14, 1931 |